Patented Oct. 16, 1951

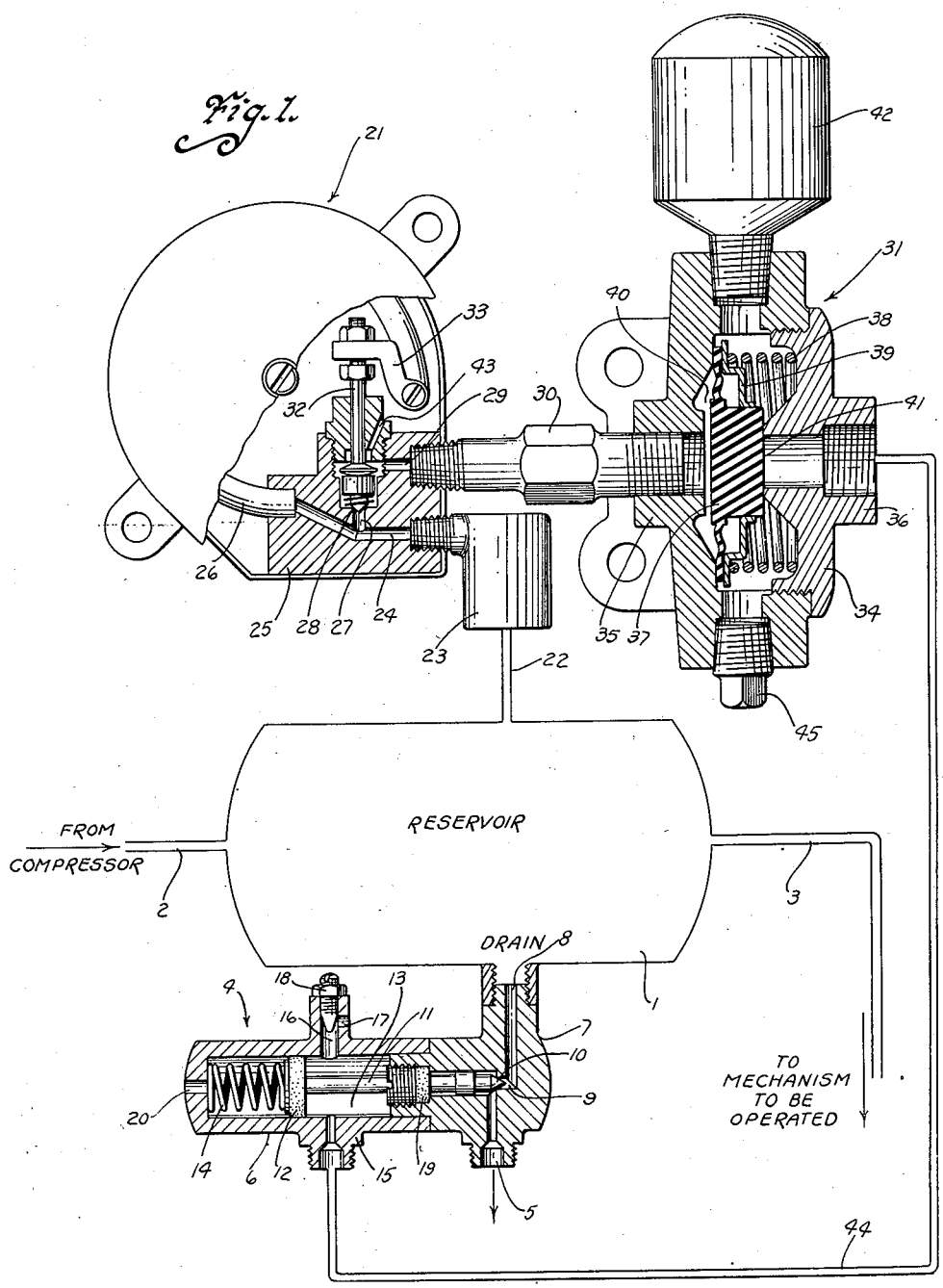

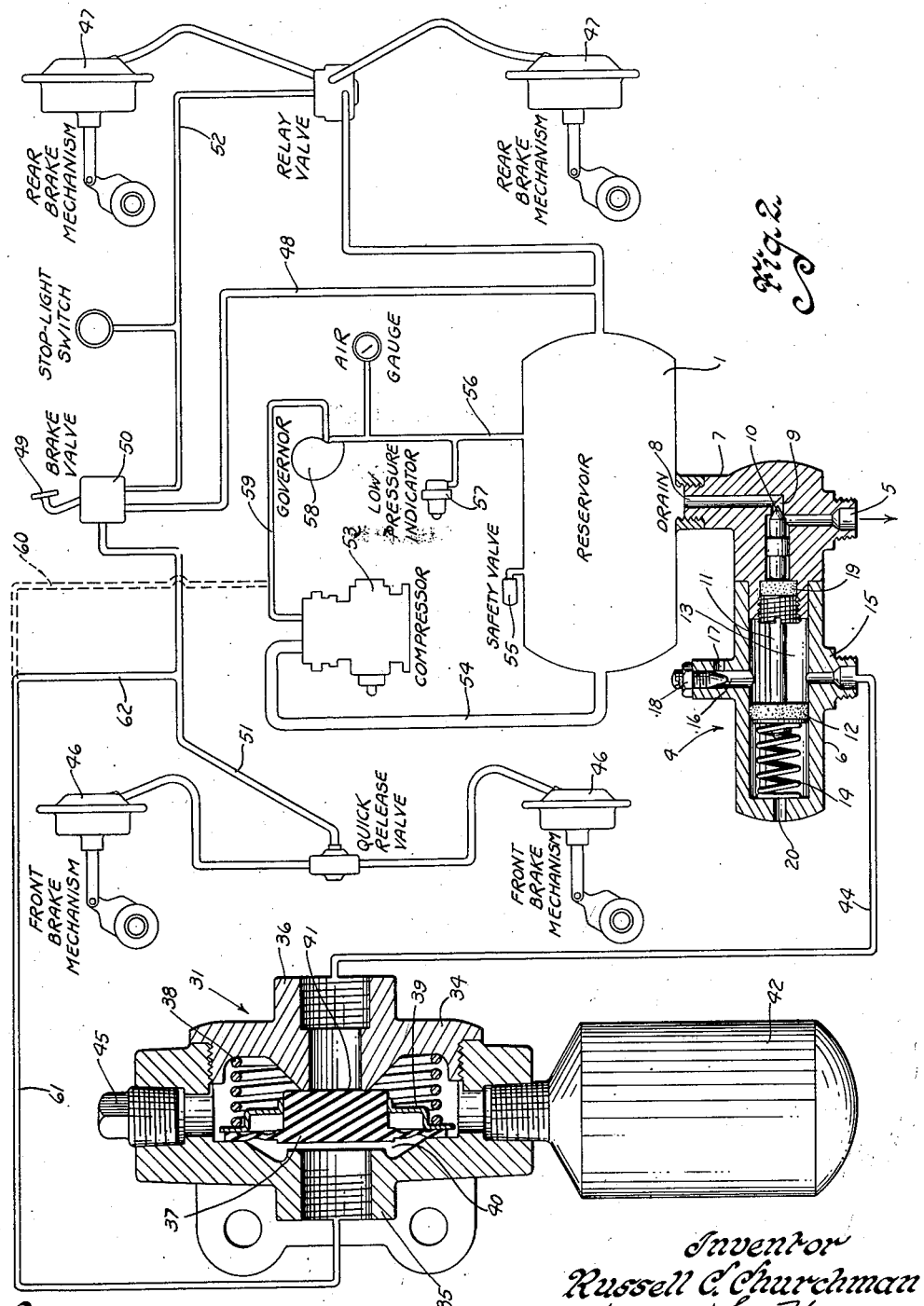

2,571,420

UNITED STATES PATENT OFFICE 2,571,420

MECHANISM FOR DRAINING MOISTURE FROM COMPRESSED-AIR STORAGE TANKS

Russell C. Churchman, Des Moines, Iowa; Nellie Churchman executrix of said Russell C. Churchman, deceased Application July 12, 1947, Serial No. 760,682

4 Claims. (Cl. 303—88)

This invention relates to a combination of valve members having a first valve mechanism to be connected to an air storage tank to drain accumulated moisture from the storage tank when the first valve mechanism is opened intermittently by air under pressure from the storage tank. The present invention finds one application in draining accumulated moisture from an air storage tank on a vehicle where the air under pressure is used to actuate air brakes for the vehicle.

When air is compressed, the pressure is increased and the equilibrium of any water vapor in solution in the air is disturbed and the water vapor drops out as a liquid in the storage tank. If the accumulated water is not drained from the air storage tank frequently, water will eventually fill the storage tank and leave no space for air. Then too, the water in the air storage tank can have a detrimental effect on a distribution system by causing corrosion. If the air under pressure is used to spray paint, it is undesirable to get water mixed with the paint. Where air brakes are used on a vehicle, it is essential that water from the air storage tank does not freeze in the brake mechanism and distribution lines in cold weather, thus rendering the air brake system useless. It is with the problem of draining an air storage tank of accumulated moisture, automatically, that the present invention is concerned.

It is an object of the present invention, among others, to provide a means to automatically drain accumulated moisture from an air storage tank connected to an air compressor unit that can be connected to the air storage tank and function, regardless of what type compressor unit is employed; a means to automatically drain accumulated moisture from an air storage tank operable by the differential of air pressure in the air storage tank when in use; a means that may be entered into a distribution system for a vehicle air brake system and be operable automatically or from the cab of the vehicle to drain accumulated moisture from an air storage tank; a means to drain accumulated moisture from an air storage tank that is simple in construction and operation, economical both in operation and construction, long lasting and more durable and requiring less repair and lost time in operation; and a means to drain accumulated moisture from an air storage tank that requires no special skill on the part of a person in mounting the means on an air storage tank.

In carrying out the objects of the invention there is provided in combination with a compressor unit and a storage tank connected therewith, a first valve mechanism connected into the storage tank and opened to drain any accumulated moisture from the storage tank through the first valve mechanism to a disposal point. The compressor unit maintains pressure in the storage tank at a predetermined pressure. There is a second valve connected with the storage tank controlling flow of air under pressure from the storage tank to a third valve member. A conduit connects the third valve member and the first valve mechanism and there are means associated with the third valve member to actuate the first valve mechanism. The third valve member has an air reservoir connected therewith which is filled with air under pressure from the storage tank when the second valve is open and the said air under pressure from the air reservoir discharges from the third valve member to actuate the first valve mechanism when the second valve closes. The inlet third valve member is opened by the air under pressure when the second valve is open and the outlet from the third valve is closed. Air under pressure flows to the air reservoir. When the second valve closes, the outlet from the third valve opens and the air under pressure from the air reservoir flows to the first valve mechanism. The second valve includes means connected to the storage tank and operable by the air under pressure from the storage tank to open the second valve to establish flow of air under pressure to the third valve member which may be a spring tube.

The first valve mechanism may be connected into a compressor unit storage tank mounted on a vehicle wherein the air under pressure is employed to actuate the brake system for the vehicle. The second valve is connected into the central distribution conduit controlling the flow of air under pressure to the third valve member. If desired the second valve can be connected with the brake pedal of the vehicle and be made to open every time the brakes of the vehicle are applied.

With the foregoing and other objects in view, the invention will be more fully described herewith and will be particularly pointed out in the claims appended hereto.

In the drawings, wherein like symbols refer to like or corresponding parts throughout the several views:

Figure 1 is a diagrammatic view of the combination of storage tank and the several valve members with the valve members shown in cross-section in the diagrammatic view to show their structure.

Figure 2 is a diagrammatic view of the combination of storage tank and several valve members with the valve members shown in cross-section in the diagrammatic view to show their structure and the whole combination mounted on a vehicle and connected into a central conduit delivering air to the brake system of the vehicle.

In Figure 1, the air storage tank 1, marked "reservoir" connects to a compressor unit (not shown) through pipe 2 and air under pressure is delivered to the storage tank 1. The compressor unit may be any type of known compressor unit and does not contribute to the novelty in any way of the present invention. An outlet pipe 3 leads from the storage tank 1 and conducts the air under pressure from storage tank 1 to any mechanism to be operable (not shown). The air is compressed to a predetermined pressure for storage in storage tank 1. For purposes of illustration let us say the top pressure is 110 pounds per square inch. When the compressor raises the pressure of the air in the storage tank 1 to the pressure of 110 pounds per square inch, mechanism (not shown) is connected to the storage tank 1 and is affected by the pressure of air in storage tank 1 to close down the compressor. When the pressure of air in storage tank 1 falls to 95 pounds per square inch, the mechanism (not shown) is again affected to start the compressor into operation again. This structure is all well known in the compressed air art and no detailed explanation is thought necessary here.

A first valve mechanism 4 is connected into the bottom of the storage tank 1 through which any accumulated moisture in the storage tank 1 may be drained to a disposal point through a passage 5 in the first valve mechanism 4. The specific first valve mechanism 4 is shown and claimed in applicant's copending application Serial No. 651,261, filed March 1, 1946, now Patent No. 2,505,663, issued April 25, 1950, hence only a brief description of the operation of the first valve mechanism 4 will be given in this application. The first valve mechanism has a housing member which is made in two parts 6 and 7, slip fitted together for ease of assembling the first valve mechanism 4. The part 7 of the housing has an inlet end 8 connecting into the bottom of the storage tank 1 through which any accumulated moisture in storage tank 1 can be drained through outlet passage 5 leading to a point of disposal. The inlet passage 8 and outlet passage 5 are connected together within the housing part 7 by a passage 9 perpendicular to both passages 5 and 8, to make a conduit through the housing part 7. One end of the passage 9 forms a valve seat 10 and a valve stem 11 seats on the seat 10 to close off flow in the conduit through the housing part 7. The valve stem 11 connects with a piston 12 reciprocal within a chamber 13 formed within the housing part 6 and a spring 14 acts against piston 12 to force the piston 12 to the right thus moving stem 11 connected to piston 12 to the right into sealing engagement with the valve seat 10; closing off passage 9. An inlet portion 15 connects into chamber 13 through which a pressure medium flows into chamber 13. The pressure medium exerts its pressure against the piston 12, forcing the piston 12 to the left against the tension built up in spring member 14 thus pulling valve stem 11 to the left unseating the stem 11 from valve seat 10 and opening the conduit through housing part 7 to drain any accumulated moisture from storage tank 1. An outlet 16 leads from chamber 13 to allow the medium under pressure to escape from chamber 13. The outlet 16 has a restricted opening 17 which can be adjusted by restricting nut 18 to vary the size of the opening 17. By varying the size of opening 17, the time interval that valve stem 11 is off valve seat 10 can be controlled for any time interval necessary to properly drain all accumulated liquid from the storage tank 1. The chamber 13 is sealed from the conduit through the housing port 7 by means of gasket 19, through which also passes valve stem 11 and the gasket 19 also seals with valve stem 11. When chamber 13 is exhausted of the pressure medium through opening 17, eventually the tension in spring 14 will overcome the pressure in chamber 13 and return valve stem 11 to valve seat 10, thus closing the conduit through the housing part 7. An opening 20 is provided in the housing part 6 to allow any of the pressure medium that may seep by the piston 12 to pass out to the atmosphere.

A second valve, represented generally at 21 connects through a pipe 22 and a coupling member 23 to storage tank 1. The second valve 21 has a passage 24 in a housing 25 within the second valve 21. In the embodiment of the second valve shown in Figure 1, the passage 24 connects with a spring tube member 26, which is the usual spring tube member set to expand under pressure. A passage 27 leads off at right angles to the passage 24 and presents a valve seat 28. The passage 27 connects into a passage 29 which connects through a conduit 30 with a third valve member 31. A valve stem 32 has one end thereof seated on the valve seat 28 closing off flow of air under pressure from the air storage tank 1 through pipe 22, fitting 23, passages 24, 27, 29 and conduit 30 to the third valve member 31. The upper end of valve stem 32 connects through a bracket 33 with the spring tube 26. When the air pressure in storage tank 1 reaches a predetermined pressure, the spring tube 26 will be expanded, thus lifting valve stem 32 off of valve seat 28 to allow flow of air under pressure from the storage tank 1 to the third valve member 31 through the second valve 21. As the pressure on the air in storage tank 1 decreases, a point is reached where the air pressure existing is insufficient to keep the spring tube 26 expanded hence the spring tube 26 returns to its normal un-expanded position in which position the valve stem 32 seats on the valve seat 28 to close off flow of air under pressure to the third valve member 31.

The third valve member 31 has a housing 34 with an inlet end 35 and an outlet end 36. A valve 37 which may be of a resilient material, such as rubber, is forced across the inlet 35 to close off flow of air under pressure from the second valve 21. A spring 38 holds the valve 37 in sealed position across inlet 35 and a metal washer 39 is placed between the valve 37 and spring 38 to prevent wear and tear on the rubber valve 37 and to insure that the rubber valve 37 will always extend completely across the inlet 35.

When the second valve 21 opens, air under pressure from storage tank 1 will flow to the third valve 31 as previously described. The air under pressure from the storage tank 1 is under a pressure that exceeds the pressure exerted by spring 38, hence the valve 37 is forced to the right and unseated from the inlet 35 to open chamber 40 to flow of air under pressure from the storage tank 1. At the same time the back face 41 of the valve 37 is forced against and seals with the outjet 36, hence no flow of air under pressure can leave the chamber 40. An air reservoir 42 is connected into housing 34 and connects into chamber 40 so as to be filled with air under pressure from the chamber 40.

When valve stem 32 in the second valve 21 is seated on valve seat 28, closing off further flow of air under pressure from the storage tank 1 through valve 21, air under pressure in conduit 30 and chamber 40 will start to exhaust through opening 43 in the housing 25 of the second valve 21. As the air under pressure exhausts from conduit 30 and chamber 40, a drop in pressure of the air is affected, to the point where the tension in spring 38 will exceed the pressure acting against valve 37 to hold it open, hence the spring 38 will force valve 37 across the inlet 35 to close off the inlet 35. This will remove the valve 37 from across the outlet 36, hence chamber 40 and air reservoir 42 will connect with outlet 36 and flow of the air under pressure stored in air reservoir 42 and chamber 40 can flow through conduit 44 to the inlet 15 of the first valve mechanism 4. The air under pressure will exert its pressure on the piston 12 to move the valve stem 11 off of seat 10 and open the first valve mechanism to allow flow of any accumulated moisture from the storage tank 1 to a point of disposal. When all of the stored air under pressure has exhausted from the third valve member, conduit 44 and chamber 13 through opening 17 of the first valve mechanism 4, valve 37 can again be opened when the second valve 21 opens to refill the third valve member 31 for another draining operation of the storage tank 1. It can therefore be seen that each time the pressure in storage tank 1 drops to 95 pounds per square inch and the compressor unit operates to bring the pressure in storage tank 1 up to the desired predetermined pressure of 110 pounds per square inch, the first valve mechanism 4 will be actuated. The air reservoir 42 may be made any size and two air reservoirs 42 may be employed by removing plug 45 and employing a second reservoir. Sufficient air must be stored in the chamber 40 and air reservoir or reservoirs 42 to fill conduit 44 and chamber 13.

The above described combination is operable for any compressor-storage tank unit in operation today because the combination is operable off the differential of pressures existing in the storage tank 1. Figure 2 shows another practical use to which the present combination can be attached, namely to automatically drain accumulated moisture from the storage tank of a compressed air system mounted on a vehicle wherein the compressed air is employed to actuate the brake system on the vehicle.

The features of the vehicle are not shown because the vehicle, air brakes, compressor unit and storage tank are all worked out and functioning at the present time on vehicles and the only problem for this use is to mount the combination of Figure 1 on the present vehicle structures.

Referring to Figure 2, the front brake mechanism is shown diagrammatically at 46 and the rear brake mechanism at 47. A central distribution system has a conduit 48 leading to a brake pedal 49 for actuating brakes 46 and 47. When brake pedal 49 is pressed down, it opens a valve (not shown) in housing 50 which allows air under pressure from storage tank 1 to flow through conduit 48, housing 50 to conduits 51 and 52 which conducts the air under pressure to the front and rear brake mechanisms 46 and 47 to actuate the same. The first valve mechanism 4 in Figure 2 is mounted on the bottom of the storage tank 1, the same as in Figure 1 and functions in a like manner. A compressor 53 is mounted on the vehicle and is operated from a power source such as a power take-off from the vehicle. Air compressed by the compressor 53 flows to air storage tank 1 through a conduit 54. The storage tank 1 carries a safety valve 55 to relieve pressure in the storage tank 1 should the pressure become too high. A conduit 56 connects into the top of storage tank 1 and has a low pressure indicator 57 therein. The low pressure indicator 57 is located in the cab of the vehicle in clear view of an operator to serve as a warning that air pressure is low and there is danger when there is insufficient pressure to actuate the air brakes. The conduit 56 connects into a governor 58, which is similar in every respect to the second valve member 21 of Figure 1.

The compressor 53 operates when the motor of the vehicle is in operation, but it doesn't operate to deliver compressed air to the storage tank 1 at all times. The governor 58 has spring tube 26 and valve stem 32 which operate the same as their operation in the second valve 21 of Figure 1. When valve stem 32 is off the valve seat 28, air under pressure will flow to conduit 59 which connects into compressor 53. The compressor 53 has a diaphragm (not shown) which controls valves (not shown) within the compressor 53. The diaphragm is moved by spring means, when no air under pressure is exerted against the diaphragm and the diaphragm moves so valves of the compressor 53 are closed, thus the compressor 53 compresses air which is delivered and stored in storage tank 1. When the air pressure in storage tank 1 reaches the predetermined value of say 110 pounds per square inch, the spring tube in governor 58 expands, pulling valve stem 32 off valve seat 28 and opens conduit 59 to the compressor 53. The air under pressure from storage tank 1 can then pass to the compressor 53 and actuate valves in the compressors so that the compressor 53 will not function to compress air. When the air under pressure in storage tank 1 reaches 95 pounds per square inch, as an example, the spring tube in governor 58 will contract and seat valve stem 32 on valve stem 28 and the compression cycle will then begin again in compressor 53.

A conduit 60 shown in dotted line connects into a conduit 61 which leads to the third valve member 31. The third valve member 31 connects by conduit 44 with the first valve mechanism 4. When the valve stem 32 within the governor 58 is pulled off valve seat 28 and air under pressure from the storage tank 1 fills conduit 59, air under pressure will enter conduit 60 and flow to the third valve member 31. The third valve member 31 functions just the same in this organization as previously described for Figure 1. It can thus be seen that as described, the first valve mechanism and the second and third valves which actuate the first valve mechanism function in this hook-up just as explained for Figure 1.

If the dotted line conduit 60 is eliminated, the first valve mechanism can be made to operate every time the brakes are applied on the vehicle. The housing 50 has a valve therein (not shown) that is opened when the brake pedal 49 is applied. The opening of this valve, which in this instance serves as the second valve, opens the conduit 48 to conduits 51 and 52. The conduit 51 has a branch conduit 62 connected therein to which connects conduit 61. It can therefore be seen that every time brake pedal 49 is applied, the third valve member is opened and the air reservoir 42 fills with air under pressure, with the air under pressure actuating the first valve mechanism 4 when the force is removed from brake pedal 49.

While the invention has been described in connection with several specific embodiments, it is to be understood that the words which have been used are words of description rather than of limitation, and that practice of the invention within the scope of the appended claims may be resorted to without departing from the true scope of the invention in all its aspects.

I claim:

1. In a device of the class described, a compressor unit, an air storage tank, a conduit connecting said compressor to said tank, an outlet from said tank, a first valve housing member detachably secured to said tank, a passageway through said valve housing that communicates at one end with the inside of said tank and at its other end with the atmosphere, a chamber within said valve disposed transversely to said passageway and communicating therewith, a valve stem in said chamber capable of closing said passageway at times, a piston on one end of said valve stem, yielding means to cause said valve stem to keep said passageway closed, a second valve housing connected to said tank, a passageway from said second valve housing communicating with the inside of said tank, a second passageway within said second housing transverse to and communicating with said first passageway therein, a valve stem within said second passageway normally preventing the passage of air therein from first passageway, means connecting said first passageway in said second valve housing with the valve stem therein so that pressure from said tank will act upon said valve stem to permit the passage of air from the first passageway into said second passageway within said second valve housing, a third valve housing connected by a conduit to the second passageway in said second valve housing, an air storage reservoir in said third housing capable of receiving air under pressure at times from said second passageway in said second valve housing, an outlet in said third housing, a chamber in said third housing, a valve member within said chamber, means for yieldingly holding said valve to close the conduit from said second valve housing; said valve capable of closing said outlet when pressure through said conduit overcomes said yielding means, a conduit communicating at one end with the outlet in said third housing and at its other end with said first valve housing so that pressure from said reservoir through said last mentioned conduit will act upon said piston in said first valve housing thereby removing the valve stem therein from the passageway to said tank and resulting in moisture in said tank being forced out through the passageway in said first valve housing.

2. In a device of the class described, a compressor unit, an air storage tank, a conduit connecting said compressor to said tank, an outlet from said tank, a first valve housing member detachably secured to said tank, a passageway through said valve housing that communicates at one end with the inside of said tank and at its other end with the atmosphere, a chamber within said valve disposed transversely to said passageway and communicating therewith, a valve stem in said chamber capable of closing said passageway at times, a piston on one end of said valve stem, yielding means to cause said valve stem to keep said passageway closed, a first outlet in said first housing forward of said piston, a second outlet in said first housing, means to adjustably restrict said second outlet, a third outlet in said first housing rearwardly of said yielding means, a second valve housing connected to said tank, a passageway from said second valve housing communicating with the inside of said tank, a second passageway within said second housing transverse to and communicating with said first passageway therein, a valve stem within said second passageway normally preventing the passage of air therein from first passageway, a bowed spring tube communicating at one end with said first passageway in said second valve housing at a point forwardly of the communication between first and second passageways therein and at its other end with the valve stem therein so that pressure from said tank will expand said tube and thereby act upon said valve stem to permit the passage of air from the first passageway into said second passageway within said second valve housing, a third valve housing connected by a conduit to the second passageway in said second valve housing, an air storage reservoir in said third housing, an outlet in said third housing, a chamber in said third housing, a valve member within said chamber, means for yieldingly holding said valve to close the conduit from said second valve housing; said valve capable of closing said outlet when pressure through said conduit overcomes said yielding means, a conduit communicating at one end with the outlet in said third housing and at its other end with said first outlet in said first valve housing so that pressure through said last mentioned conduit will act upon said piston in said first valve housing thereby removing the valve stem therein from the passageway to said tank and resulting in moisture in said tank being forced out through the passageway in said first valve housing; said device designed so that where air under pressure in said tank is great enough to unseat the valve stem in said second valve housing it will also overcome the resistance of the yielding means in said third valve housing to store air under pressure in the reservoir of said third valve housing and that when air under pressure passing from the second valve housing to the third valve housing is incapable of overcoming the resistance of the yielding means in said third valve housing, the stored pressure in said third housing will be released to said first housing to actuate the valve stem therein and permit accumulated moisture within said tank to be discharged.

3. In a device of the class described, a compressor unit, an air storage tank, a conduit connecting said compressor to said tank, an outlet from said tank, a first valve housing member detachably secured to said tank, a passageway through said valve housing that communicates at one end with the inside of said tank and at its other end with the atmosphere, a chamber within said valve disposed transversely to said passageway and communicating therewith, a valve stem in said chamber capable of closing said passageway at times, a piston on one end of said valve stem, yielding means to cause said valve stem to keep said passageway closed, a first outlet in said first housing forward of said piston, a second outlet in said first housing, means to adjustably restrict said second outlet, a third outlet in said first housing rearwardly of said yielding means, a second valve housing connected to said tank, a passageway from said second valve housing communicating with the inside of said tank, a second passageway within said second housing transverse to and communicating with said first passageway therein, a valve stem within said second passageway normally preventing the passage of air therein from first passageway, means connecting said first passageway in said second valve housing with the valve stem therein so that pressure from said tank will act upon said valve stem to permit the passage of air from the first passageway into said second passageway within said second valve housing, a third valve housing connected by a conduit to the second passageway in said second valve housing, an air storage reservoir in said third housing capable of receiving air under pressure at times from said second passageway in said second valve housing, an outlet in said third housing, a chamber in said third housing, a valve member within said chamber, means for yieldingly holding said valve to close the conduit from said second valve housing; said valve capable of closing said outlet when pressure through said conduit overcomes said yielding means, a conduit communicating at one end with the outlet in said third housing and at its other end with said first outlet in said first value housing so that pressure from said reservoir through said last mentioned conduit will act upon said piston in said first valve housing thereby removing the valve stem therein from the passageway to said tank and resulting in moisture in said tank being forced out through the passageway in said first valve housing; said device designed so that where air under pressure in said tank is great enough to unseat the valve stem in said second valve housing it will also overcome the resistance of the yielding means in said third valve housing to store air under pressure in the reservoir of said third valve housing and that when air under pressure passing from the second valve housing to the third valve housing is incapable of overcoming the resistance of the yielding means in said third valve housing, the stored pressure in said third housing will be released to said first housing to actuate the valve stem therein and permit accumulated moisture within said tank to be discharged.

4. In a device of the class described, a compressor unit, an air storage tank, a conduit connecting said compressor to said tank, an outlet from said tank, a first valve housing member detachably secured to said tank, a passageway through said valve housing that communicates at one end with the inside of said tank and at its other end with the atmosphere, a chamber within said valve disposed transversely to said passageway and communicating therewith, a valve stem in said chamber capable of closing said passageway at times, a piston on one end of said valve stem, yielding means to cause said valve stem to keep said passageway closed, a second valve housing connected to said tank, a passageway from said second valve housing communicating with the inside of said tank, a second passageway within said second housing transverse to and communicating with said first passageway therein, a valve stem within said second passageway normally preventing the passage of air therein from first passageway, a bowed spring tube communicating at one end with said first passageway in said second valve housing at a point forwardly of the communication between first and second passageways therein and at its other end with the valve stem therein so that pressure from said tank will expand said tube and thereby act upon said valve stem to permit the passage of air from the first passageway into said second passageway within said second valve housing, a third valve housing connected by a conduit to the second passageway in said second valve housing, an air storage reservoir in said third housing capable of receiving air under pressure at times from said second passageway in said second valve housing, an outlet in said third housing, a chamber in said third housing, a valve member within said chamber, means for yieldingly holding said valve to close the conduit from said second valve housing; said valve capable of closing said outlet when pressure through said conduit overcomes said yielding means, a conduit communicating at one end with the outlet in said third housing and at its other end with said first valve housing so that pressure from said reservoir through said last mentioned conduit will act upon said piston in said first valve housing thereby removing the valve stem therein from the passageway to said tank and resulting in moisture in said tank being forced out through the passageway in said first valve housing; said device designed so that where air under pressure in said tank is great enough to unseat the valve stem in said second valve housing it will also overcome the resistance of the yielding means in said third valve housing and that when air under pressure passing from the second valve housing to the third valve housing is incapable of overcoming the resistance of the yielding means in said third valve housing, the stored pressure in said third housing will be released to said first housing to actuate the valve stem therein and permit accumulated moisture within said tank to be discharged.

RUSSELL C. CHURCHMAN.

REFERENCES CITED

The following references are of record in the file of this patent:

UNITED STATES PATENTS

| Number | Name | Date |
|---|---|---|
| 1,579,073 | Bullock | Mar. 30, 1926 |
| 2,330,040 | Fitch | Sept. 21, 1943 |
| 2,345,379 | Campbell | Mar. 28, 1944 |
| 2,361,084 | Canetta | Oct. 24, 1944 |